United States Patent Office.

WILLIAM PAYNE, JAMES HYNDES GILLIES, AND AUGUST GONDOLF, OF ORANGE, NEW SOUTH WALES, AUSTRALIA.

PROCESS OF TREATING COPPER ORES.

SPECIFICATION forming part of Letters Patent No. 719,132, dated January 27, 1903.

Application filed July 19, 1902. Serial No. 116,294. (No specimens.)

*To all whom it may concern:*

Be it known that we, WILLIAM PAYNE, JAMES HYNDES GILLIES, and AUGUST GONDOLF, subjects of the King of Great Britain, residing at the town of Orange, in the State of New South Wales, in the Commonwealth of Australia, have invented a certain new and useful Process in the Treatment of Copper Ores, of which the following is a specification.

Our invention relates to improvements in the treatment of copper ores.

This invention relates to the treatment of copper ores; and it consists of roasting sulfid, oxid, or carbonate ores, and thereby converting them to sulfate or sulfates and chlorid ores, followed by leaching with water and the subsequent precipitation of the copper, as hereinafter described.

In the treatment of sulfid ores by our process the ore is first crushed to a sufficient degree of fineness—say when it passes through a thirty-mesh sieve. The crushed ore is then roasted and oxidized in the ordinary way in any suitable furnace, after which it is saturated with a solution of ferrous sulfate or ferrous sulfate and chlorid and mixed with a small percentage of iron sulfid or sulfur according to the percentage of copper present. It is then subjected to another roasting, which converts it into a sulfate or sulfate and chlorid. The ore is now dumped in its heated state into a leaching-vat containing water and leached in the ordinary way and the copper contained in the solution which comes away precipitated on iron in the usual manner. The object of saturating the ore after the first roasting, as above described, with the ferrous sulfate or sulfate and chlorid solution and iron sulfid is to insure the complete conversion of the copper oxid to copper sulfate without the danger of any portion of the copper being converted into an insoluble form.

When treating carbonate or oxid ores, it is found necessary to add from one to four per cent. of iron sulfid or sulfur, (according to the percentage of copper present.) In treating these ores only one roast is necessary.

Should it be deemed advisable or found convenient to precipitate a portion of the copper from its solution by electrolysis, metallic iron and sulfur may be used in the furnace, together with a less proportion of ferrous sulfate or sulfate and chlorid solution during the second roast in the manner above described.

In practice the ferrous-sulfate solution, which is used, as above described, for saturating the ore, is obtained from the precipitating-vat when the precipitation of the copper has been effected by scrap-iron in the usual way. The sulfuric acid produced during the roasting of the ore to a sulfate leaves the copper in the precipitating-vat and uniting with the iron forms ferrous sulfate. The addition of ferrous chlorid is obtained when required by the addition of a small quantity of hydrochloric acid during precipitation.

Having now particularly described and ascertained the nature of our said invention and in what manner the same is to be performed, we declare that what we claim is—

1. The herein-described process of treating copper ores, the same consisting in first roasting to an oxid, next saturating the same with a solution of ferrous sulfate or sulfate and chlorid, next roasting again and meanwhile adding a small percentage of iron sulfid or sulfur according to the percentage of copper present, and finally leaching the hot ore.

2. The herein-described process of treating copper ores, the same consisting in first reducing the ore to a suitable fineness, then roasting it to an oxid, then saturating with a solution of ferrous sulfate or sulfate and chlorid, then roasting again and adding iron sulfid or sulfur proportionate to the copper present, then leaching the hot ore in water, and finally precipitating the copper.

Signed at Bathurst this 3d day of June, 1902.

WILLIAM PAYNE.
JAMES HYNDES GILLIES.
AUGUST GONDOLF.

Witnesses:
J. H. McINTOSH,
CHARLES V. NAYLOR.